(12) United States Patent
Bruno et al.

(10) Patent No.: US 11,466,717 B2
(45) Date of Patent: Oct. 11, 2022

(54) MECHANICAL LOCKING SYSTEM FOR PANELS

(71) Applicant: Välinge Innovation AB, Viken (SE)

(72) Inventors: Jimmie Bruno, Viken (SE); Zoran Simunic, Viken (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

(21) Appl. No.: 17/119,392

(22) Filed: Dec. 11, 2020

(65) Prior Publication Data

US 2021/0180630 A1    Jun. 17, 2021

(30) Foreign Application Priority Data

Dec. 11, 2019  (EP) ...................................... 19215296

(51) Int. Cl.
*F16B 12/24* (2006.01)
*F16B 5/00* (2006.01)
(Continued)

(52) U.S. Cl.
CPC ............ *F16B 12/24* (2013.01); *F16B 5/0012* (2013.01); *A47B 2230/0037* (2013.01);
(Continued)

(58) Field of Classification Search
CPC ............ A47B 47/0066; A47B 47/0075; A47B 47/025; A47B 47/042; A47B 2088/902; A47B 2230/0029; A47B 2230/0037; A47B 2230/0081; F16B 5/0012; F16B 5/0016; F16B 5/0044; F16B 5/0052; F16B 5/002;
(Continued)

(56) References Cited

U.S. PATENT DOCUMENTS 6,045,290 A * 4/2000 Nocievski ............. F16B 12/125
403/230
8,887,468 B2  11/2014 Håkansson et al.
(Continued)

FOREIGN PATENT DOCUMENTS

CN    108 343 659 A    7/2018
DE    102012103831 A1 * 11/2013 .............. F16B 12/26
(Continued)

OTHER PUBLICATIONS

International Search Report and Written Opinion dated Jan. 21, 2021 in PCT/EP2020/085775, European Patent Office, Rijswijk, NL, 11 pages.
(Continued)

*Primary Examiner* — Josh Skroupa
(74) *Attorney, Agent, or Firm* — Buchanan Ingersoll & Rooney P.C.

(57) ABSTRACT

A set of panels including a first panel with a first main plane and a second panel with a second main plane is described. The first panel and the second panel are provided with a mechanical locking device for locking of a first edge of the first panel to a second edge of the second panel at a junction plane, wherein the first main plane is essentially perpendicular to the second main plane and the junction plane is extending at an angle to the first main plane and the second main plane between the first main plane and the second main plane.

16 Claims, 13 Drawing Sheets

(51) Int. Cl.
*F16B 12/04* (2006.01)
*F16B 12/10* (2006.01)
*F16B 12/46* (2006.01)

(52) U.S. Cl.
CPC ......... *F16B 12/46* (2013.01); *F16B 2012/043* (2013.01); *F16B 2012/103* (2013.01); *Y10T 403/602* (2015.01); *Y10T 403/7075* (2015.01)

(58) Field of Classification Search
CPC ........ F16B 12/125; F16B 12/20; F16B 12/24; F16B 12/26; F16B 12/46; F16B 2012/043; F16B 2012/046; F16B 2012/103; F16B 2012/466; Y10T 403/602; Y10T 403/7075; Y10T 403/7092
See application file for complete search history.

(56) References Cited

U.S. PATENT DOCUMENTS

| | | |
|---|---|---|
| 9,375,085 B2 | 6/2016 | Derelöv |
| 9,538,842 B2 | 1/2017 | Håkansson et al. |
| 9,655,442 B2 | 5/2017 | Boo et al. |
| 9,714,672 B2 | 7/2017 | Derelöv et al. |
| 9,723,923 B2 | 8/2017 | Derelöv |
| 9,726,210 B2 | 8/2017 | Derelöv et al. |
| 9,945,121 B2 | 4/2018 | Derelöv |
| 10,034,541 B2 | 7/2018 | Boo et al. |
| 10,202,996 B2 | 2/2019 | Håkansson et al. |
| 10,415,613 B2 | 9/2019 | Boo |
| 10,448,739 B2 | 10/2019 | Derelöv et al. |
| 10,451,097 B2 | 10/2019 | Brännström et al. |
| 10,486,245 B2 | 11/2019 | Fridlund |
| 10,506,875 B2 | 12/2019 | Boo et al. |
| 10,544,818 B2 | 1/2020 | Fridlund |
| 10,548,397 B2 | 2/2020 | Derelöv et al. |
| 10,669,716 B2 | 6/2020 | Derelöv |
| 10,670,064 B2 | 6/2020 | Derelöv |
| 10,724,564 B2 | 7/2020 | Derelöv |
| 10,731,688 B2 | 8/2020 | Brännström et al. |
| 10,736,416 B2 | 8/2020 | Derelöv et al. |
| 10,830,266 B2 | 11/2020 | Fridlund |
| 10,830,268 B2 | 11/2020 | Boo |
| 10,871,179 B2 | 12/2020 | Håkansson et al. |
| 10,876,562 B2 | 12/2020 | Pervan |
| 10,876,563 B2 | 12/2020 | Derelöv et al. |
| 10,968,936 B2 | 4/2021 | Boo et al. |
| 11,076,691 B2 | 8/2021 | Boo |
| 11,083,287 B2 | 8/2021 | Boo et al. |
| 11,098,484 B2 | 8/2021 | Derelöv |
| 11,137,007 B2 | 10/2021 | Fridlund |
| 11,204,051 B2 | 12/2021 | Brännström et al. |
| 11,246,415 B2 | 2/2022 | Derelöv et al. |
| 2012/0279161 A1 | 11/2012 | Håkansson et al. |
| 2015/0035422 A1 | 2/2015 | Håkansson et al. |
| 2015/0078807 A1 | 3/2015 | Brännström et al. |
| 2015/0078819 A1 | 3/2015 | Derelöv et al. |
| 2015/0196118 A1 | 7/2015 | Derelöv |
| 2015/0198191 A1 | 7/2015 | Boo |
| 2016/0007751 A1 | 1/2016 | Derelöv |
| 2016/0174704 A1 | 6/2016 | Boo et al. |
| 2016/0270531 A1 | 9/2016 | Derelöv |
| 2017/0079433 A1 | 3/2017 | Derelöv et al. |
| 2017/0089379 A1 | 3/2017 | Pervan |
| 2017/0097033 A1 | 4/2017 | Håkansson et al. |
| 2017/0159291 A1 | 6/2017 | Derelöv |
| 2017/0208938 A1 | 7/2017 | Derelöv et al. |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Derelöv |
| 2017/0360193 A1 | 12/2017 | Boo et al. |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0119717 A1 | 5/2018 | Derelöv |
| 2018/0202160 A1 | 7/2018 | Derelöv |
| 2018/0328396 A1 | 11/2018 | Fransson et al. |
| 2019/0113061 A1 | 4/2019 | Håkansson et al. |
| 2019/0166989 A1 | 6/2019 | Boo et al. |
| 2019/0191870 A1 | 6/2019 | Derelöv |
| 2019/0195256 A1 | 6/2019 | Derelöv |
| 2019/0269240 A1* | 9/2019 | Bobillier ............... F16B 12/125 |
| 2019/0289999 A1 | 9/2019 | Derelöv et al. |
| 2019/0320793 A1 | 10/2019 | Boo |
| 2019/0323532 A1 | 10/2019 | Boo |
| 2019/0323533 A1 | 10/2019 | Boo |
| 2019/0323534 A1 | 10/2019 | Derelöv |
| 2019/0323535 A1 | 10/2019 | Derelöv |
| 2020/0003242 A1 | 1/2020 | Brännström et al. |
| 2020/0055126 A1 | 2/2020 | Fridlund |
| 2020/0069048 A1 | 3/2020 | Derelöv et al. |
| 2020/0069049 A1 | 3/2020 | Derelöv et al. |
| 2020/0102978 A1 | 4/2020 | Fridlund |
| 2020/0121076 A1 | 4/2020 | Derelöv et al. |
| 2020/0214447 A1 | 7/2020 | Derelöv et al. |
| 2020/0300284 A1 | 9/2020 | Pervan |
| 2020/0337455 A1 | 10/2020 | Boo et al. |
| 2020/0340513 A1 | 10/2020 | Derelöv |
| 2021/0079650 A1 | 3/2021 | Derelöv |
| 2021/0148392 A1 | 5/2021 | Brännström et al. |
| 2021/0190112 A1 | 6/2021 | Derelöv |
| 2021/0207635 A1 | 7/2021 | Håkansson et al. |
| 2021/0222716 A1 | 7/2021 | Derelöv et al. |
| 2021/0262507 A1 | 8/2021 | Svensson et al. |
| 2021/0262508 A1 | 8/2021 | Svensson et al. |
| 2021/0276108 A1 | 9/2021 | Derelöv et al. |
| 2021/0285480 A1 | 9/2021 | Derelöv et al. |
| 2021/0381251 A1 | 12/2021 | Svensson |
| 2022/0018373 A1 | 1/2022 | Boo |
| 2022/0049735 A1 | 2/2022 | Meijer |

FOREIGN PATENT DOCUMENTS

| | | | | |
|---|---|---|---|---|
| DE | 102014110123 A1 * | 1/2016 | ............. | F16B 12/26 |
| EP | 2641505 A1 * | 9/2013 | ............. | F16B 12/24 |
| EP | 3 135 838 A1 | 3/2017 | | |
| IT | UA20 162 212 A1 | 10/2017 | | |
| WO | WO-2013118075 A1 * | 8/2013 | ............. | F16B 12/125 |
| WO | WO 2015/038059 A1 | 3/2015 | | |
| WO | WO 2017/131574 A1 | 8/2017 | | |

OTHER PUBLICATIONS

Extended European Search Report issued in EP Application No. 19215296.5 dated Jun. 2, 2020, European Patent Office, Munich, DE, 9 pages.

Meijer, Thomas, U.S. Appl. No. 17/398,416 entitled "Panels with Edge Reinforcement," filed in the U.S. Patent and Trademark Office Aug. 10, 2021.

Sostar, Marko, U.S. Appl. No. 17/514,055 entitled "Set of Panels, A Method for Assembly of the Same, and a Locking Device for a Furniture Product," filed in the U.S. Patent and Trademark Office Oct. 29, 2021.

Brännström, Hans, et al., U.S. Appl. No. 17/524,293 entitled "Assembled Product and a Method of Assembling the Assembled Product," filed in the U.S. Patent and Trademark Office Nov. 11, 2021.

Derelov, Peter, et al., U.S. Appl. No. 17/546,356 entitled "Rail for Cabinets," filed in the U.S. Patent and Trademark Office Dec. 9, 2021.

Boo, Christian, U.S. Appl. No. 17/556,146 entitled "Wedge-shaped Tongue Groove," filed in the U.S. Patent and Trademark Office Dec. 20, 2021.

Rydsjö, Oscar, U.S. Appl. No. 17/665,160 entitled "Mounting Bracket," filed in the U.S. Patent and Trademark Office Feb. 4, 2022.

* cited by examiner

MECHANICAL LOCKING SYSTEM FOR PANELS

CROSS REFERENCE TO RELATED APPLICATIONS

The present application claims the benefit of European Application No. 19215296.5, filed on Dec. 22, 2019. The entire contents of European Application No. 19215296.5 are hereby incorporated herein by reference in their entirety.

TECHNICAL FIELD

Embodiments of the present invention relate to panels configured to be locked together with a mechanical locking device. The panels may be panels that may be assembled and locked together to obtain a furniture product, such as a bookshelf, a cupboard, a wardrobe, a box, a drawer or a furniture component and may thereafter be dismantled. The mechanical locking device may comprise a flexible tongue.

TECHNICAL BACKGROUND

A furniture product provided with a mechanical locking device is known in the art, as evidenced by WO 2015/038059 or WO 2017/131574. The furniture products earlier described comprise a first panel connected perpendicular to a second panel by a mechanical locking device comprising a flexible tongue in an insertion groove.

The above description of various known aspects is the applicant's characterization of such, and is not an admission that any of the above description is considered as prior art.

Embodiments of the present invention address a need to provide panels that can be assembled and dismantled, having an improved stiffness and strength of the mechanical locking device.

SUMMARY

It is an object of certain aspects of the present invention to provide an improvement over the above described techniques and known art. A specific objective is to improve assembling of panels, such as furniture panels, locked together by a mechanical locking device. The panels may be a part of a furniture product, such as a furniture component, a drawer, a cupboard, a bookshelf, a wardrobe, a kitchen fixture, or a box.

A further object of at least certain aspects of the present invention is to facilitate assembling and disassembling of panels configured to be assembled with a locking device that is easy to manufacture and to use.

A further object of at least certain aspects of the present invention is to facilitate assembling of panels configured to be assembled with a locking device that is easy to use and install and which reduces the risk of incorrect installation thereof.

A further object of at least certain aspects of the present invention is to facilitate assembling of panels configured to be assembled in a more stable and aesthetic way.

At least some of these and other objects and advantages that will be apparent from the description have been achieved by a set of panels comprising a first panel with a first main plane and a second panel with a second main plane, wherein the first panel and the second panel are provided with a mechanical locking device for locking of a first edge of the first panel to a second edge of the second panel at a junction plane, wherein the first main plane is essentially perpendicular to the second main plane and the junction plane is extending at an angle to the first main plane and the second main plane between the first main plane and the second main plane, characterized in that the second edge comprises a first edge tongue, a first panel surface of the first panel comprises an edge groove, wherein the first edge tongue is configured to cooperate with the edge groove for locking together the first panel and the second panel in a first direction which is perpendicular to the second main plane, the second edge comprises a second edge tongue, the second edge tongue comprises a tongue groove, the first edge comprises a locking element, said locking element is configured to cooperate with the tongue groove for locking together the first edge and the second edge in a second direction which is perpendicular to the first main plane.

According to an aspect the locking element comprises a flexible tongue arranged in an insertion groove.

According to an aspect the junction plane extends through the insertion groove.

According to an aspect the flexible tongue extends through a centre plane of the first panel.

According to an aspect an angle between the junction plane and the second main plane is about 45°.

The angle between the junction plane and the second main plane is preferably about 45°. A different angle may be preferred for a set with different thicknesses of the first and the second panel. The angle is preferably adapted such that the junction plane extends through an intersection of an outer face of the first panel and an outer face of the second panel to an intersection of an inner face of the first panel and an inner face of the second panel. The inner face of the first panel is facing the inner face of the second panel. An outer face of the first panel is opposite to the inner face of the first panel. An outer face of the second panel is opposite to the inner face of the second panel.

According to an aspect the first edge tongue does not extend through the junction plane.

According to an aspect the first edge comprises a third edge tongue.

According to an aspect a first locking surface of the third edge tongue is configured to cooperate with a second locking surface of the second edge tongue for locking in the second direction.

According to an aspect a ratio between a thickness T of the second edge tongue and a thickness Y of the first and/or second panel is within the range of about 0.1 to about 0.5, preferably about 0.2 to about 0.4, more preferably about 0.3.

According to an aspect an outermost end of the second locking surface of the second edge tongue is positioned at a distance X from a bottom surface of the second edge, wherein X is about 0.5-1.5 Y, preferably about 0.75-1.25 Y, more preferably X=Y, and wherein an angle between the second locking surface and the second main plane preferably is about 45°.

According to an aspect an outer opening of the edge groove is positioned at a distance Z from the first edge, wherein Z is about 0.2-0.8 Y, preferably about 0.35-0.7 Y, more preferably about 0.5-0.6 Y.

According to an aspect the first edge tongue has a first edge tongue surface, wherein an angle between the first edge tongue surface and the second main plane preferably is about 45°.

According to an aspect the first edge tongue has a second edge tongue surface, wherein the second edge tongue surface is essentially parallel with a second panel surface.

According to an aspect the second edge tongue surface extends a distance L from the bottom surface of the second edge, wherein L is within the range of about 1 mm to about 3 mm, preferably about 1.5 mm to about 2.5 mm, more preferably about 2 mm.

According to an aspect the first edge tongue surface extends from the second panel surface of the second panel.

According to an aspect the edge groove has a third locking surface, wherein the third locking surface and the second edge tongue surface are essentially parallel and are configured to cooperate for locking in the first direction when the first panel and the second panel are in a locked position, and wherein the third locking surface and the second edge tongue surface are preferably extending essentially in the second direction.

According to an aspect the third locking surface extends a distance B into the first panel, wherein B is within the range of about 1.2 mm to about 3.2 mm, preferably about 1.7 mm to about 2.7 mm, more preferably about 2.2 mm.

According to an aspect the mechanical locking device further comprises at least one rod-shaped element at the second edge and at least one insertion groove at the first panel surface, wherein the rod-shaped element is configured to be inserted into the insertion groove, the rod-shaped element extends essentially parallel with the second panel surface, and the insertion groove extends into the first panel surface at an angle that is essentially perpendicular to the first panel surface.

According to an aspect the rod-shaped element is positioned between the first edge tongue and the second edge tongue and the insertion groove is positioned between the edge groove and first edge.

According to an aspect the rod-shaped element is positioned partly in the first edge tongue and the insertion groove is positioned partly in the edge groove.

According to an aspect the rod-shaped element is arranged in a rod-element groove in the bottom surface of the second edge.

According to an aspect the first and second panel comprise particleboard.

According to an aspect the first and second panel consist essentially of particleboard, possible comprising a decor coating.

According to an aspect the second edge tongue, when the first panel and the second panel are in a locked position, covers the first edge.

According to an aspect the rod-shaped element enters the insertion groove before the second locking surface meets the locking element.

According to an aspect the core of the first panel and/or of the second panel may be a wood-based core, preferably made of MDF, HDF, OSB, WPC, plywood or particleboard. The core may also be a plastic core comprising thermosetting plastic or thermoplastic e.g. vinyl, PVC, PU or PET. The plastic core may comprise fillers.

The first panel and/or the second panel may also be of solid wood.

The first panel and/or the second panel may be provided with a decorative layer, such as a foil or a veneer, on one or more surfaces.

BRIEF DESCRIPTION OF THE DRAWINGS

These and other aspects, features and advantages of which embodiments of the invention are capable of, will be apparent and elucidated from the following description of embodiments and aspects of the present invention, reference being made to the accompanying drawings, in which.

DETAILED DESCRIPTION

Figure 1:
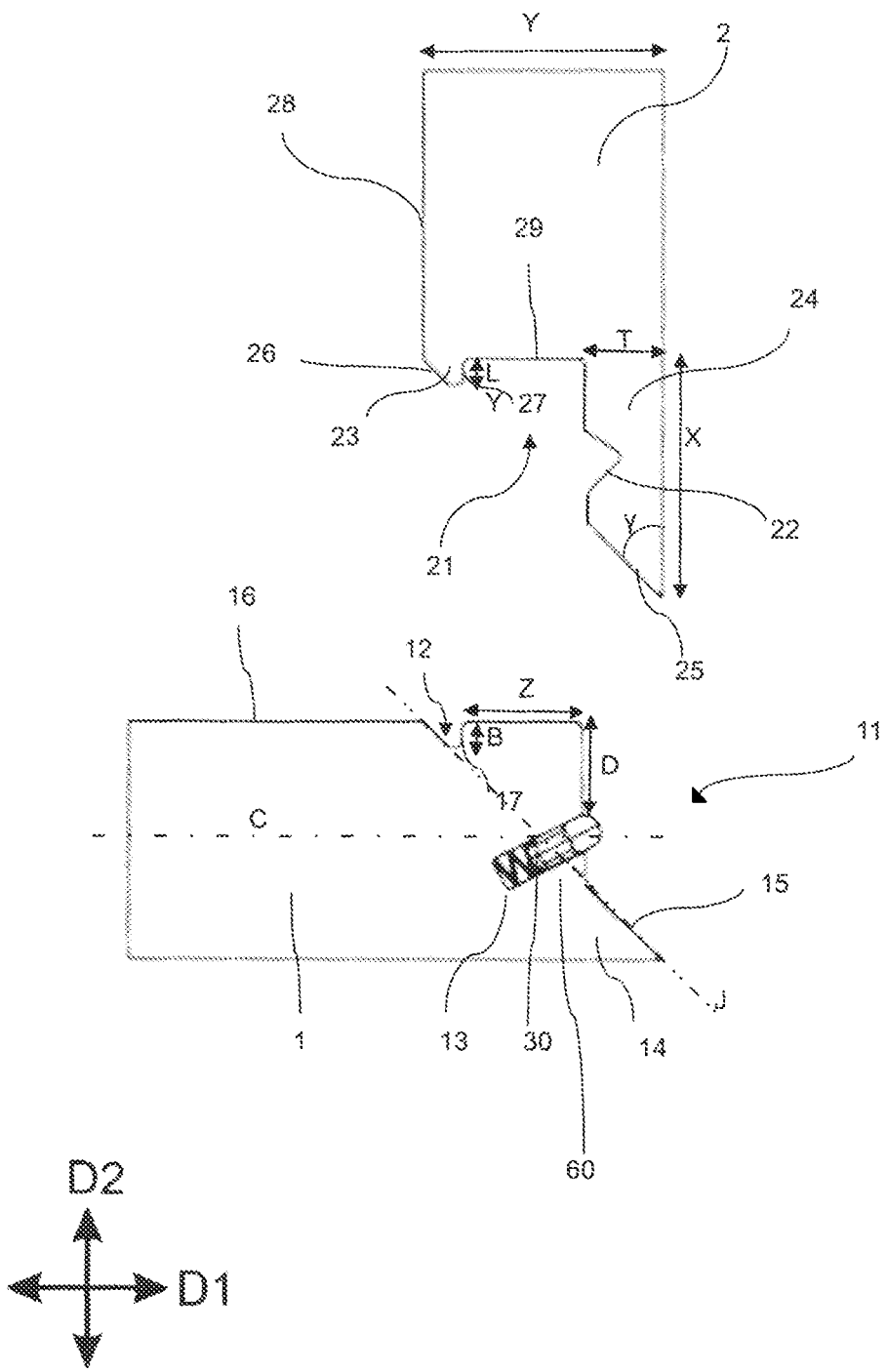
FIG. 1 shows an embodiment of the first panel and the second panel in a non-locked position, where the locking element comprises a flexible tongue positioned in the insertion groove.

Specific embodiments of the invention will now be described with reference to the accompanying drawings.

This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example aspects may be implemented at least in part by means of both hardware and software, and that several "means", "units" or "devices" may be represented by the same item of hardware.

The different aspects, alternatives and embodiments of the invention disclosed herein can be combined with one or more of the other aspects, alternatives and embodiments described herein. Two or more aspects can be combined.

As used herein, the term "about" means ±10% of the noted value. By way of example only, an angle of "about 45°" could include from 40.5° up to and including 49.5°.

Figure 2:
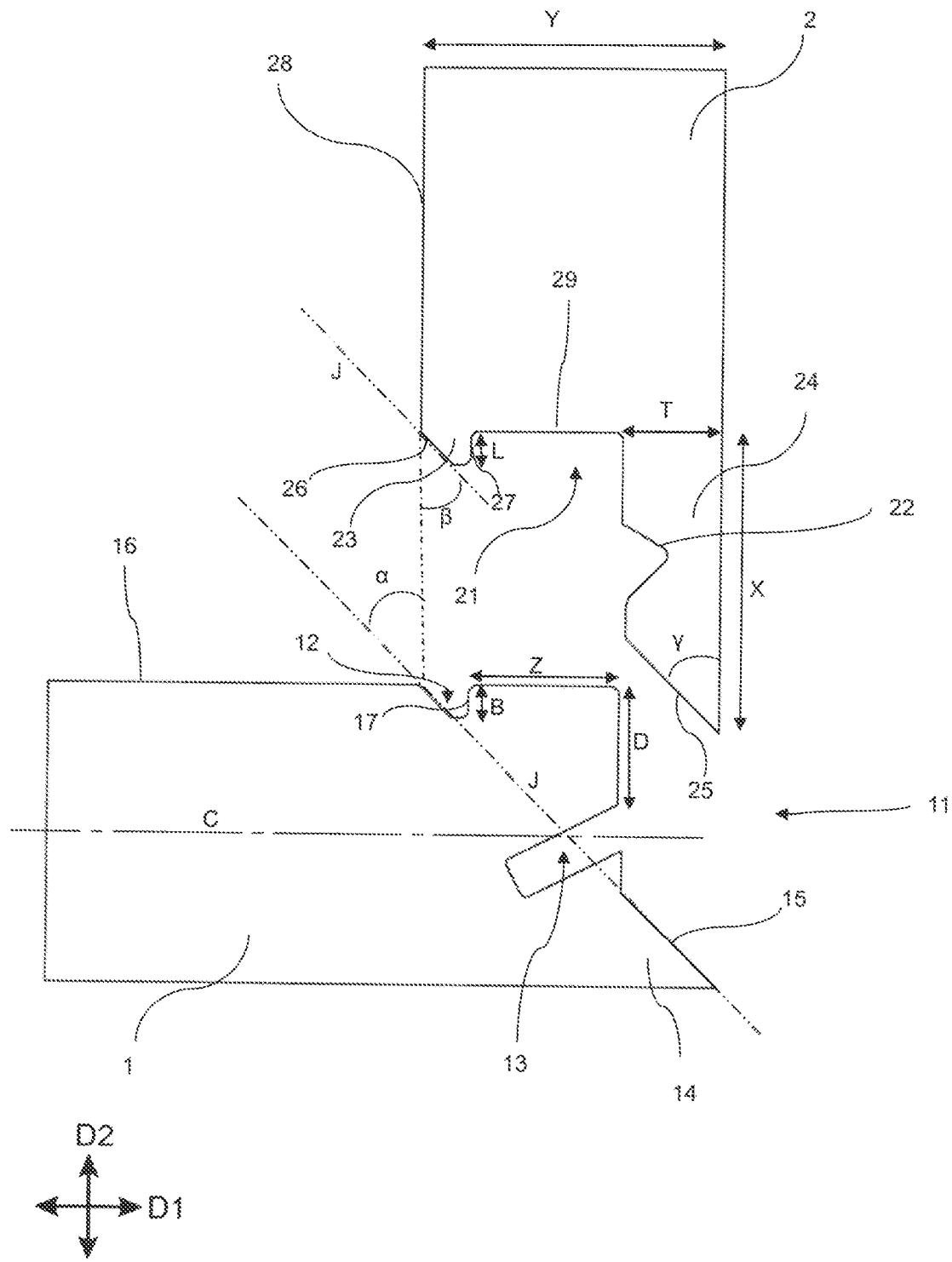
FIG. 2 shows an embodiment of the first panel and the second panel in a non-locked position.
Figure 3:
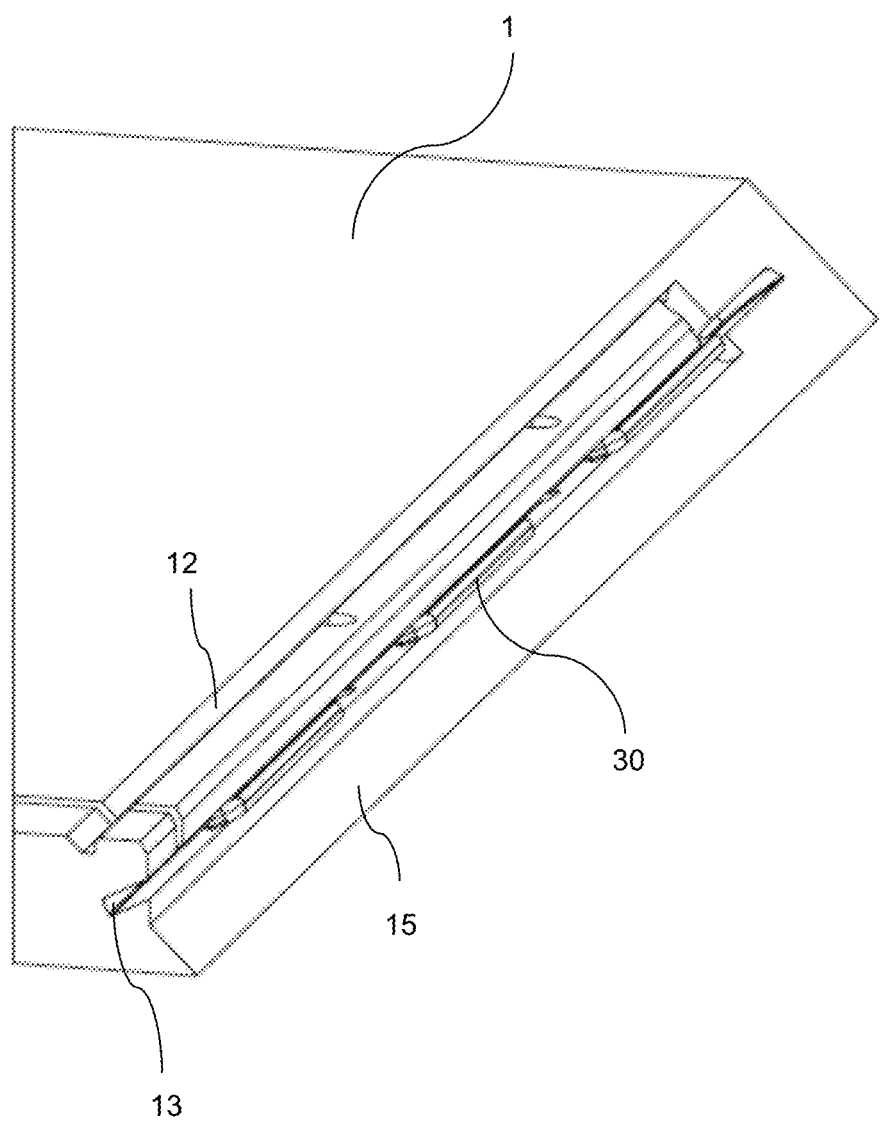
FIG. 3 show a partial perspective view of a first panel with a flexible tongue positioned in the insertion groove.

A first embodiment of the invention is shown e.g. in FIGS. 1-2 including a set of panels comprising a first panel 1 with a first main plane and a second panel 2 with a second main plane. The first panel 1 and the second panel 2 are provided with a mechanical locking device for locking of a first edge 11 of the first panel 1 to a second edge 21 of the second panel 2 at a junction plane J. The first main plane is essentially perpendicular to the second main plane and the junction plane J extends at an angle to the first main plane and the second main plane between the first main plane and the second main plane. The second edge 21 comprises a first edge tongue 23. A first panel surface 16 of the first panel 1 comprises and edge groove 12, wherein the first edge tongue 23 is configured to cooperate with the edge groove 12 for locking together the first panel 1 and the second panel 2 in a first direction D1 which is perpendicular to the second main plane. The second edge 21 comprises a second edge tongue 24, the second edge tongue 24 comprises a tongue groove 22, and the first edge 11 comprises a locking element 60. The locking element 60 is configured to cooperate with the tongue groove 22 for locking together the first edge 11 and the second edge 21 in a second direction D2 which is perpendicular to the first main plane.

In one embodiment, as e.g. shown in FIGS. 1 and 3-4C, the locking element 60 may comprise a flexible tongue 30. The flexible tongue 30 may be arranged in an insertion groove 13.

Figure 4A:
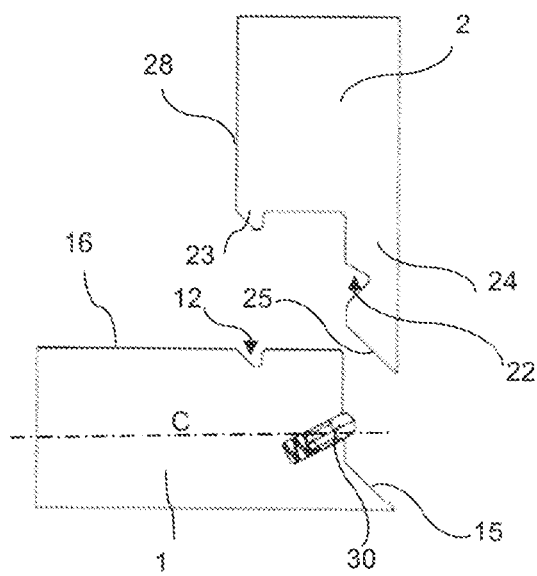
FIGS. 4A-4C show an embodiment of the invention during assembling and in a locked position, wherein a flexible tongue is positioned in the insertion groove.
Figure 4B:
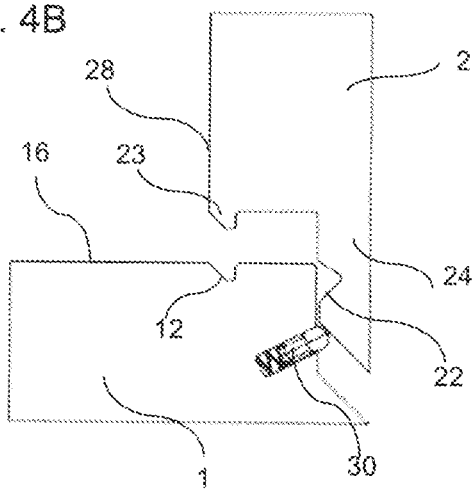
Figure 4C:
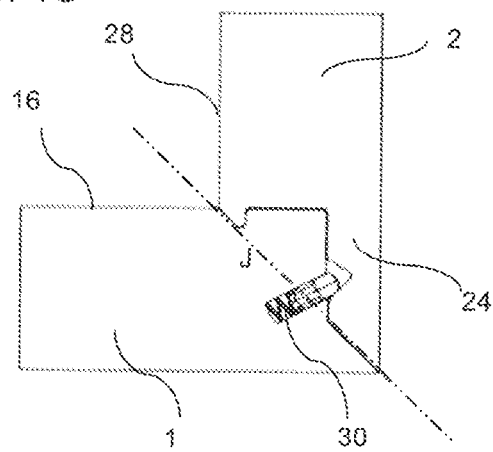
Figure 5:
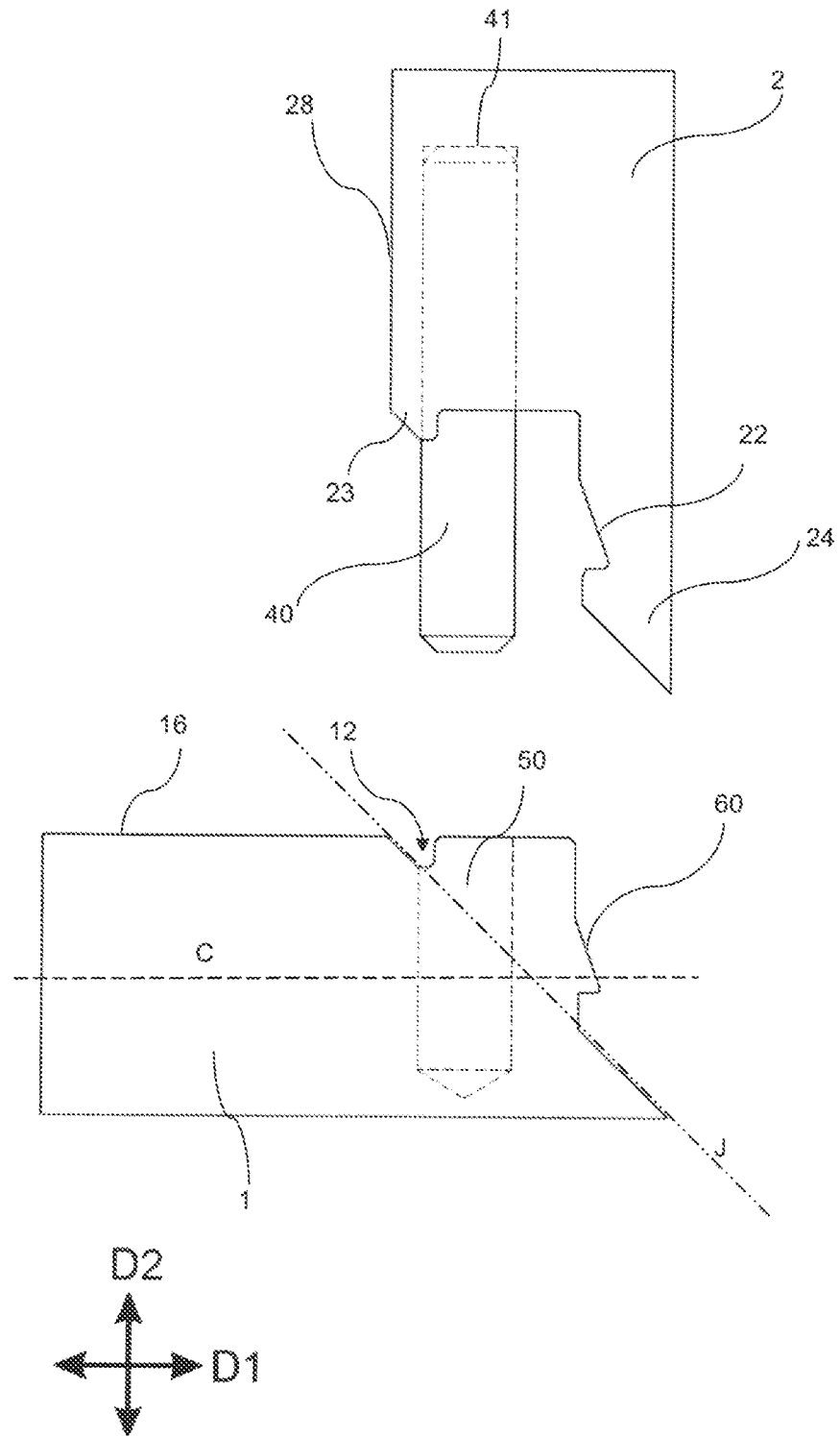
FIG. 5 shows an embodiment of the first panel and the second panel in a non-locked position, where the locking device comprises a rod-shaped element at the second edge and an insertion groove at the first panel surface. The rod-shaped element is positioned partly in the first edge tongue and the insertion groove is positioned partly in the edge groove. The locking element is formed of the core material of the panel.
Figure 6:
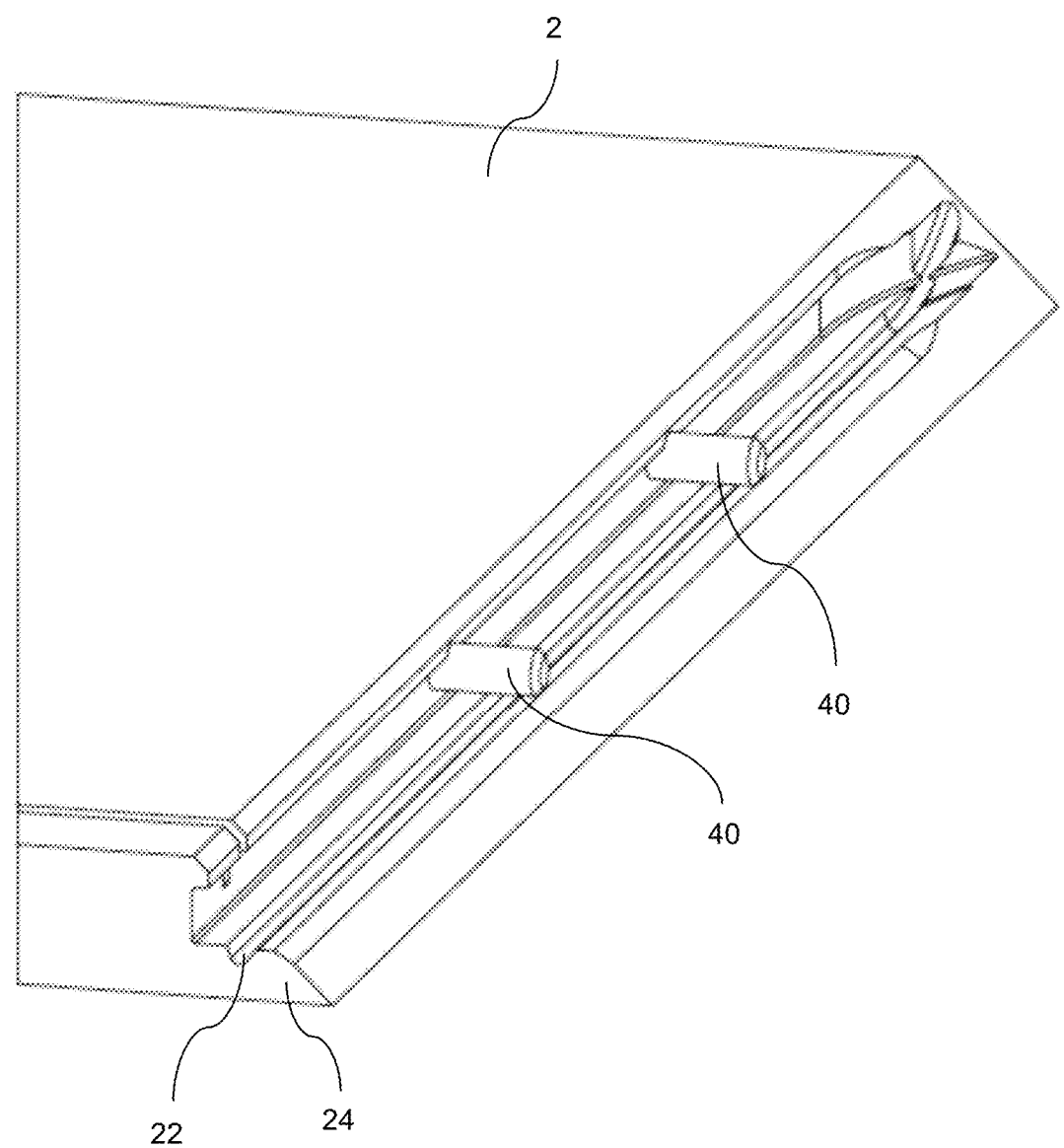
FIG. 6 shows a partial perspective view of a second panel comprising two rod-shaped elements at the second edge.
Figure 7A:
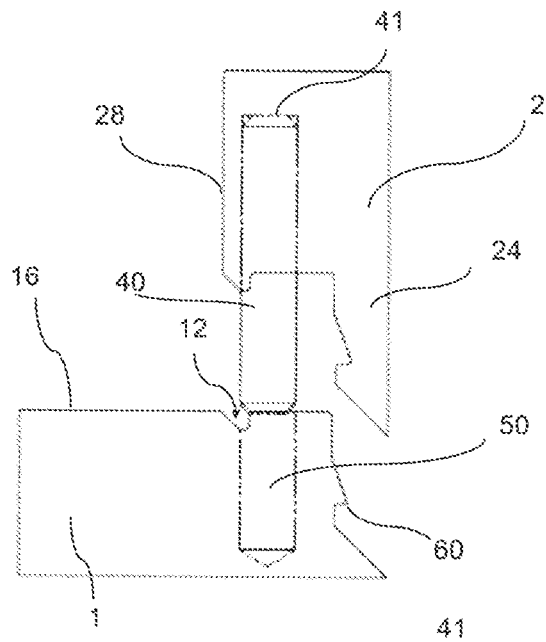
FIGS. 7A-7C show an embodiment of the invention during assembling and in a locked position, where the locking device comprises a rod-shaped element at the second edge and an insertion groove at the first panel surface. The rod-shaped element is positioned partly in the first edge tongue and the insertion groove is positioned partly in the edge groove. The locking element is formed of the core material of the panel.
Figure 7B:
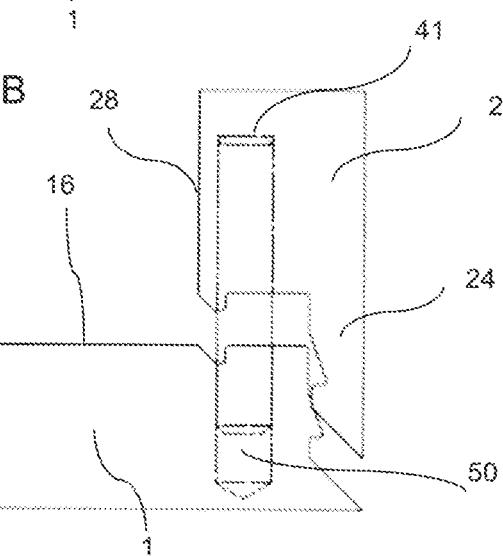
Figure 7C:
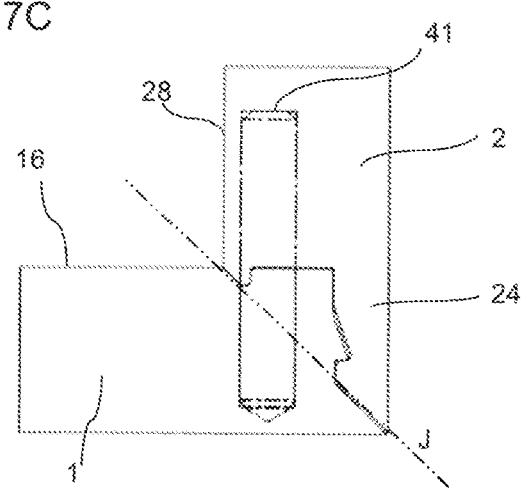

FIGS. 4A-4C show an embodiment of the first panel 1 and the second panel 2 during assembling of a set of panels, such as a furniture product. The flexible tongue 30 is arranged in the insertion groove 13. The second panel 2 may be assembled by displacing second first panel 2 relative the first panel 1 in a direction which is perpendicular to the first panel surface 16. The mechanical locking device may be configured to automatically lock the second panel 2 to the first panel 1 when a first locking surface 15 is arranged against a second locking surface 25.

The junction plane J may extend through the insertion groove 13. The flexible tongue 30 may extend through a centre plane C of the first panel 1 (e.g., both in a state prior to locking, and in locking state). An inner opening of the insertion groove 13 may be positioned at a first distance D from the first panel surface 16 of the first panel 1, wherein the first distance D preferably is within the range of about 3 to about 15 mm, preferably about 5 mm to about 10 mm, more preferably about 7 mm to about 8 mm. By this positioning of the insertion groove 13, and thereby also the flexible tongue 30 that is positioned in the insertion groove 13, the strength of the mechanical locking device is increased and the risk that a part of the first edge 11 is broken off is decreased.

The flexible tongue 30 may comprise a flexible material to enable compression and a displacement of the flexible tongue 30 in the insertion groove 13 during assembling and disassembling.

The flexible tongue 30 may comprise an element which is flexible to enable compression and a displacement of the flexible tongue 30 in the insertion groove 13 during assembling and another element which is less flexible in order to improve the locking strength.

FIGS. 5-7C show an embodiment of the set of panels according to the present invention, where the mechanical locking device may comprise at least one rod-shaped element 40 at the second edge 21 and at least one insertion groove 50 at the first panel surface 16. The at least one rod-shaped element 40 may be at the first panel surface 16, and the at least one insertion groove 50 may be at the second edge 21 (not shown). The rod-shaped element 40 may be configured to be inserted into the insertion groove 50. The rod-shaped element 40 may extend essentially parallel with the second panel surface 28, and the insertion groove 50 may extend into the first panel surface 16 at an angle that is essentially perpendicular to the first panel surface 16. According to the embodiment as shown in FIGS. 5 and 7A-7C, the locking element 60 does not comprise a flexible tongue 30, but it is formed of the core material of the panel.

FIGS. 8-11C show an embodiment of the set of panels according to the present invention, where the mechanical locking device may comprise at least one rod-shaped element 40 at the second edge 21 and at least one insertion groove 50 at the first panel surface 16. The at least one rod-shaped element 40 may be at the first panel surface 16, and the at least one insertion groove 50 may be at the second edge 21 (not shown). The rod-shaped element 40 may be configured to be inserted into the insertion groove 50. The rod-shaped element 40 may extend essentially parallel with the second panel surface 28, and the insertion groove 50 may extend into the first panel surface 16 at an angle that is essentially perpendicular to the first panel surface 16. According to the embodiment as shown in FIGS. 8-11C, the locking element 60 comprises a flexible tongue 30 arranged in the insertion groove 13.

The junction plane J may extend through the insertion groove 13. The flexible tongue 30 may extend through a centre plane C of the first panel 1 (e.g., both in a state prior to locking, and in locking state). An inner opening of the insertion groove 13 may be positioned at a first distance D from the first panel surface 16 of the first panel 1, wherein the first distance D is within the range of about 3 to about 15 mm, preferably about 5 mm to about 10 mm, more preferably about 7 mm to about 8 mm. By this positioning of the insertion groove 13, and thereby also the flexible tongue 30 that is positioned in the insertion groove 13, the strength of the mechanical locking device is increased and the risk that a part of the first edge 11 is broken off is decreased.

The flexible tongue 30 may comprise a flexible material to enable compression and a displacement of the flexible tongue 30 in the insertion groove 13 during assembling and disassembling.

The flexible tongue 30 may comprise an element which is flexible to enable compression and a displacement of the flexible tongue 30 in the insertion groove 13 during assembling and another element which is less flexible in order to improve the locking strength.

The rod-shaped element 40 and the insertion groove 50, as shown in FIGS. 5-11C, facilitate the assembly of the set of panels by guidance of the different parts of the set of panels in the correct place.

Figure 8:
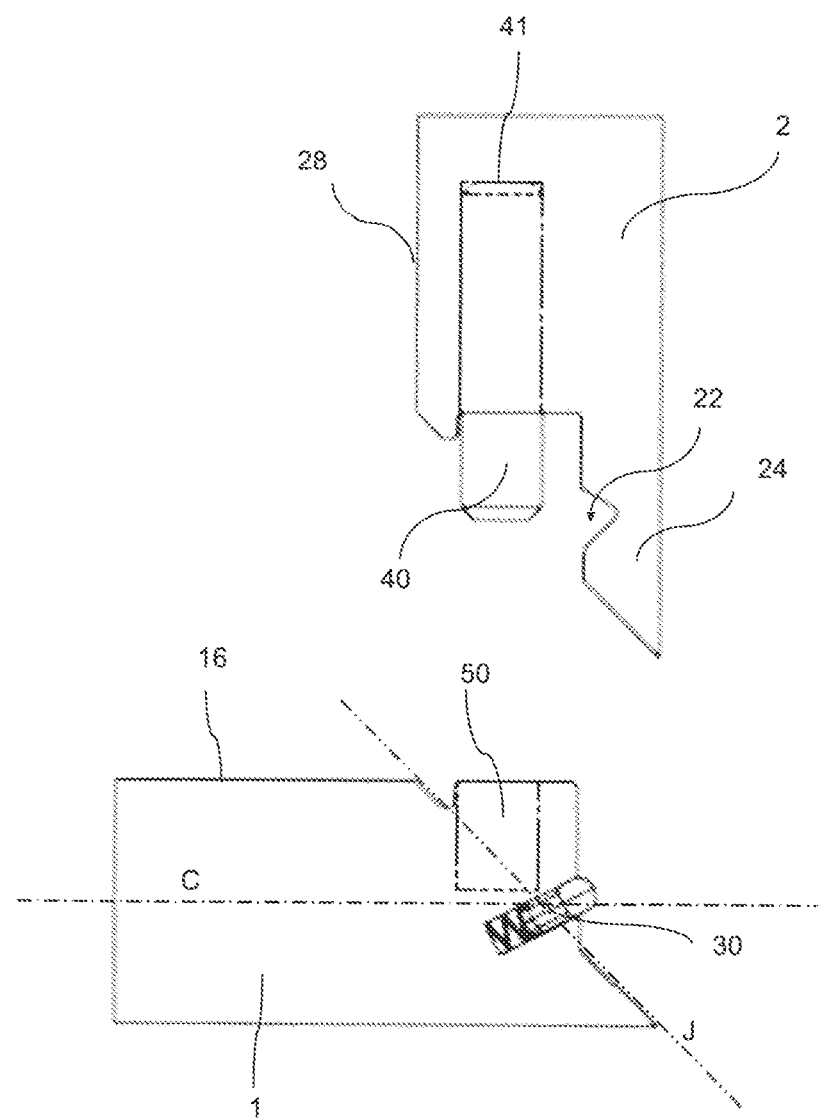
FIG. 8 shows an embodiment of the first panel and the second panel in a non-locked position, where a flexible tongue is positioned in the insertion groove and the locking device comprises a rod-shaped element at the second edge and an insertion groove at the first panel surface. The insertion groove is positioned between the edge groove and the first edge.
Figure 9A:
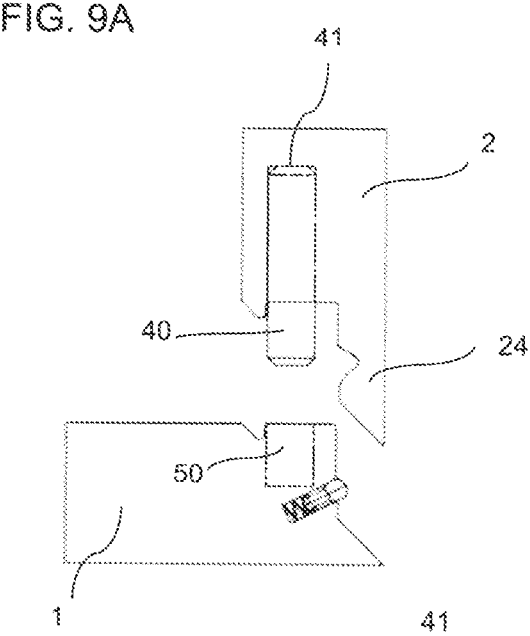
FIGS. 9A-9C show an embodiment of the invention during assembling and in a locked position, where a flexible tongue is positioned in the insertion groove and the locking device comprises a rod-shaped element at the second edge and an insertion groove at the first panel surface. The insertion groove is positioned between the edge groove and the first edge.
Figure 9B:
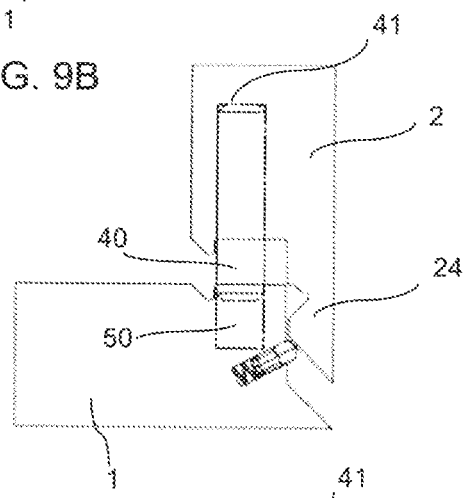
Figure 9C:
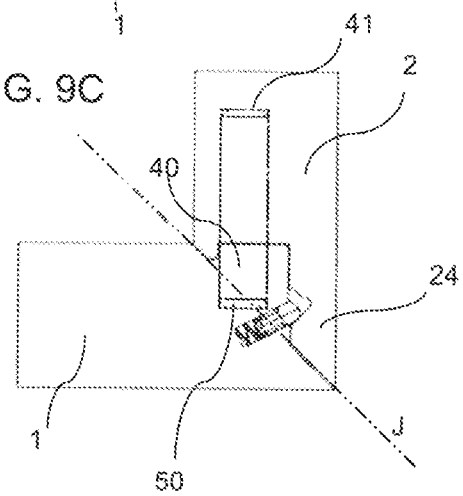
Figure 10:
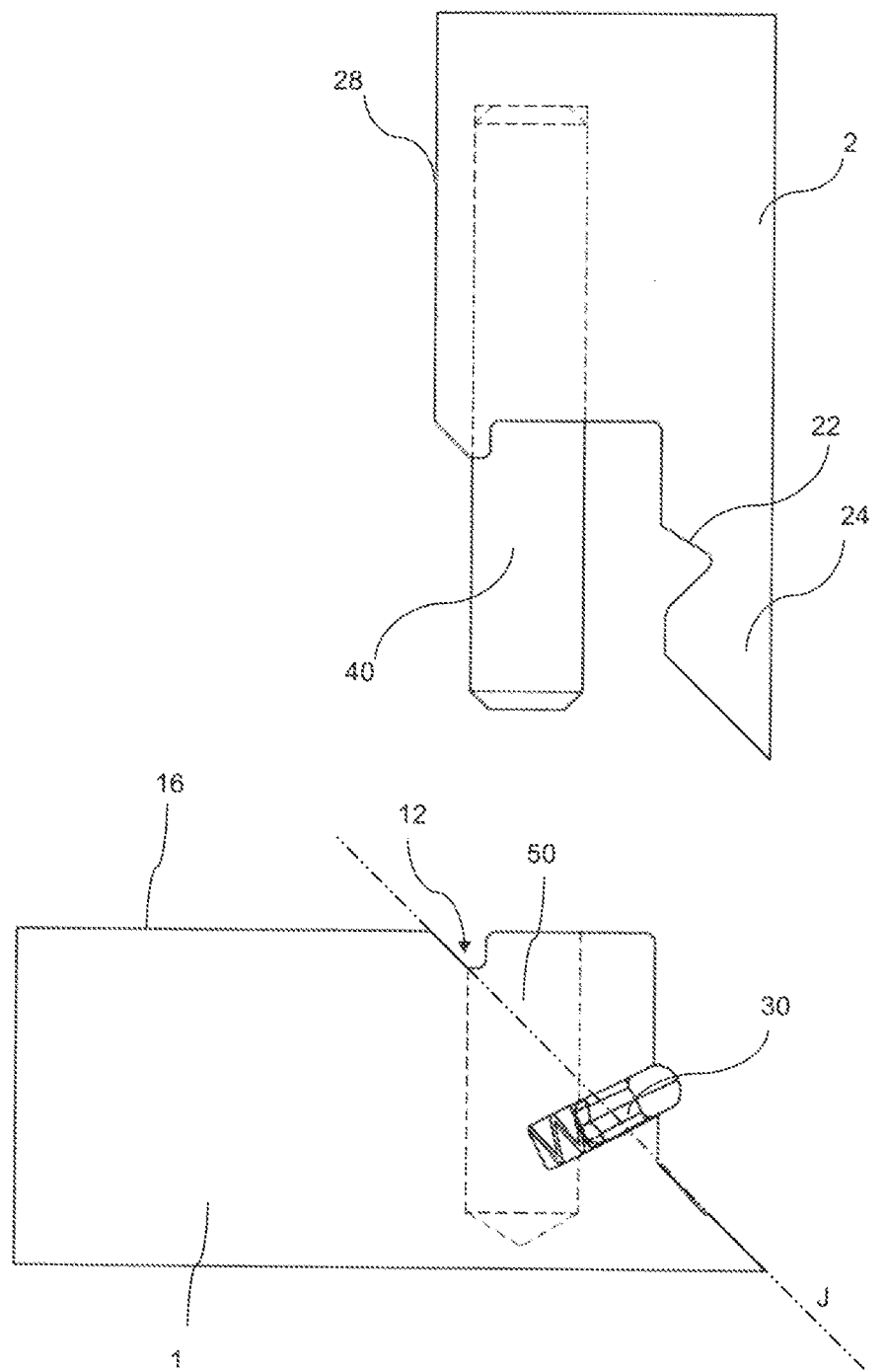
FIG. 10 shows an embodiment of the first panel and the second panel in a non-locked position, where a flexible tongue is positioned in the insertion groove and the locking device also comprises a rod-shaped element at the second edge and an insertion groove at the first panel surface. The rod-shaped element is positioned partly in the first edge tongue and the insertion groove is positioned partly in the edge groove.
Figure 11A:
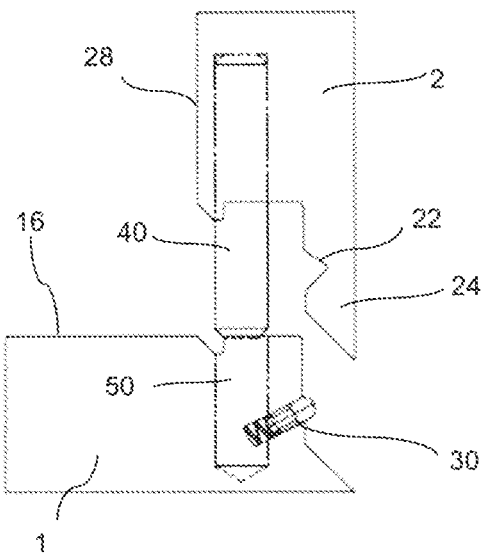
FIGS. 11A-11C show an embodiment of the invention during assembling and in a locked position, where a flexible tongue is positioned in the insertion groove and the locking device comprises a rod-shaped element at the second edge and an insertion groove at the first panel surface. The rod-shaped element is positioned partly in the first edge tongue and the insertion groove is positioned partly in the edge groove.
Figure 11B:
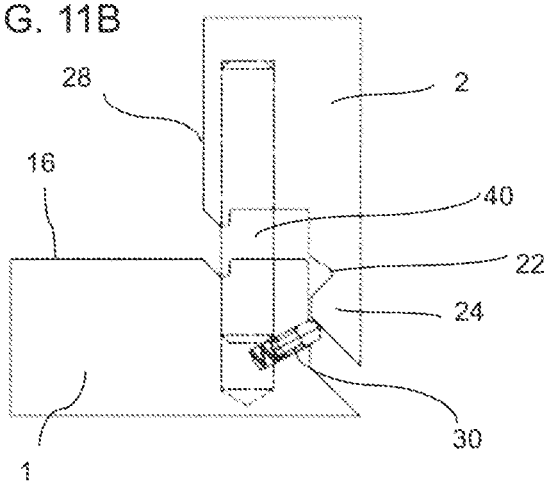
Figure 11C:
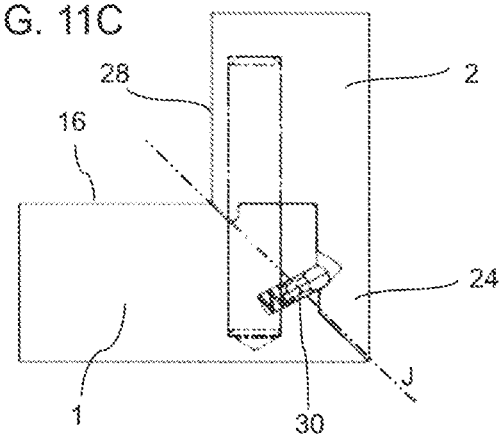

The rod-shaped element 40 may be positioned between the first edge tongue 23 and the second edge tongue 24. The insertion groove 50 may be positioned between the edge groove 12 and first edge 11. An embodiment showing this is shown in FIGS. 8-9C.

The rod-shaped element 40 may be positioned partly in the first edge tongue 23 and the insertion groove 50 may be positioned partly in the edge groove 12. Embodiments showing this are shown in FIGS. 5, 7A-7C, and 10-11C.

The rod-shaped element 40 of the embodiments described above may be arranged in a rod-element groove 41 in the bottom surface 29 of the second edge 21.

The rod-shaped element 40 may be configured to be glued in the rod-element groove 41.

The rod-shaped element 40 may be configured to be locked in the rod-element groove 41 by a friction connection or by a mechanically connection, such as threads or by a locking element 60, such as a barb.

The rod-shaped element 40 may enter the insertion groove 50 before the second locking surface 25 meets the locking element 60. For example, before the second locking surface contacts the flexible tongue 30. This facilitates steering of the first panel 1 and the second panel 2 in the correct position during assembly.

Figure 12A:
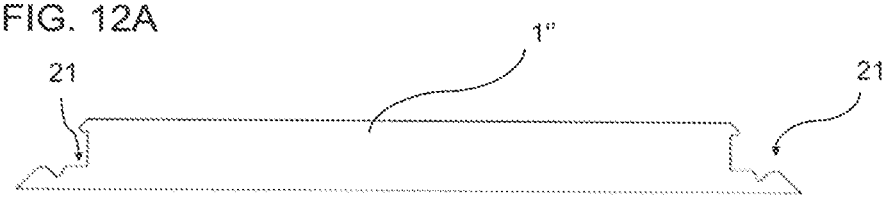
FIGS. 12A-12C show different embodiments of the first and second panel according to the invention.
Figure 12B:
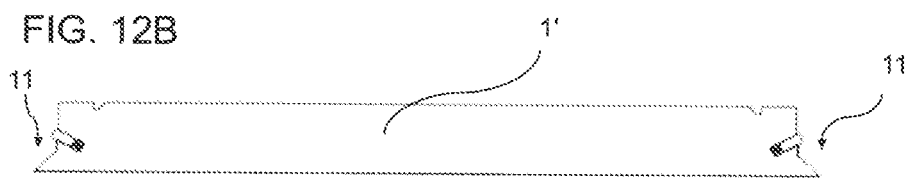
Figure 12C:
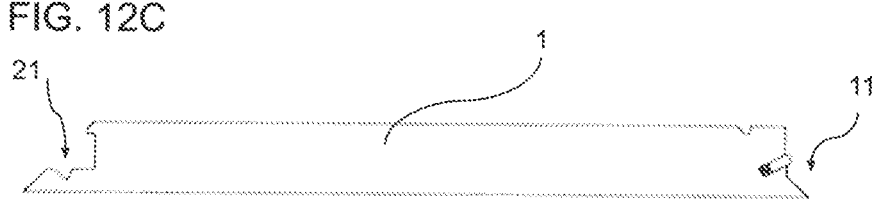

FIGS. 12A-12C show different embodiments of the first and second panel 1, 2 of the present invention. The panel 1" of FIG. 12A comprises two of said second edge 21, the panel 1' of FIG. 12B comprises two of said first edge 11, while the panel 1 of FIG. 12C comprises one of said first edge 11 and one of said second edge 21.

Two panels 1" according to FIG. 12A can e.g. be used together with two panels 1' according to FIG. 12B for assembly of a furniture product, such as a box, while e.g. four panels according to FIG. 12C can be used for assembly of furniture product, such as a box. Alternatively, one panel 1" according to FIG. 12A, one panel 1' according to FIG. 12B, and two panels 1 according to FIG. 12D can be used for assembly of furniture product, such as a box 61.

Figure 13:
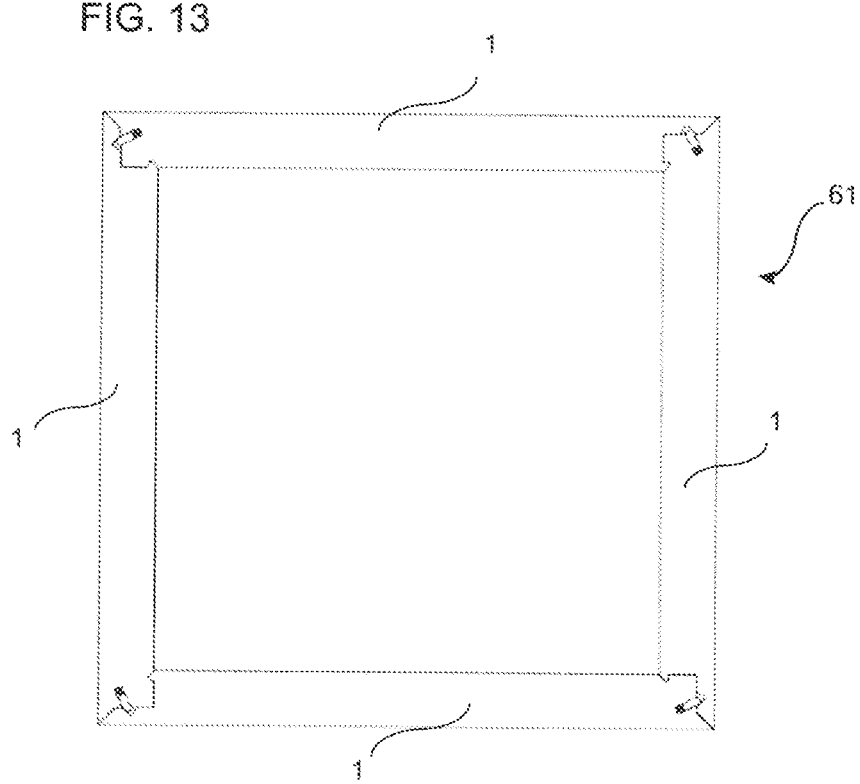
FIG. 13 shows an embodiment of a set of panels according to the invention in an assembled state.

FIG. 13 shows a set of four panels 1 as shown in FIG. 12C in a locked position, creating a box 61.

Figure 14:
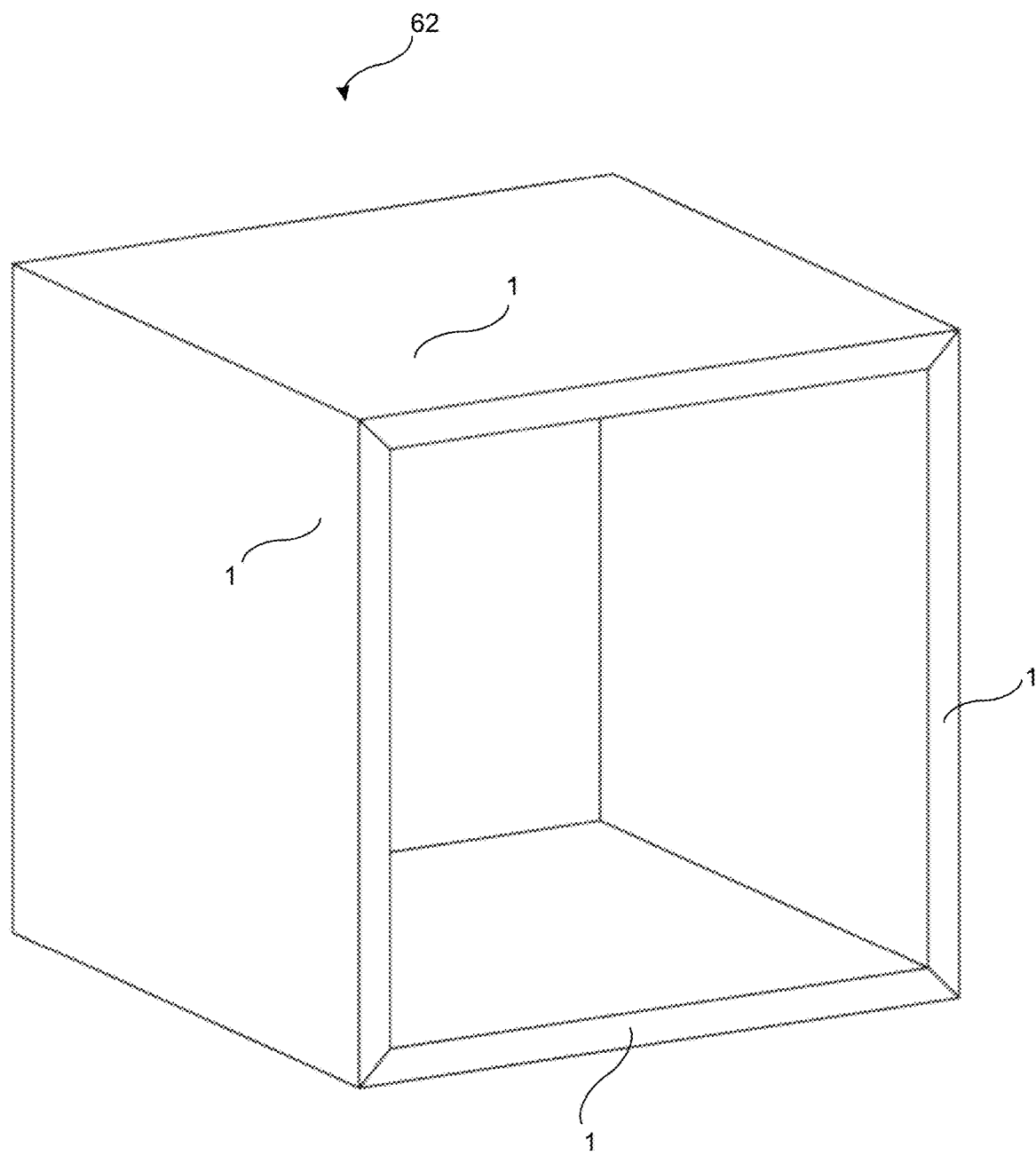
FIG. 14 shows a 3D-view of an embodiment of a set of panels according to the invention in an assembled state.

FIG. 14 shows a 3D view of four panels 1 according to an embodiment of the present invention in a locked position creating a furniture product 62. In this embodiment, the mechanical locking device is not visible when the panels are assembled, giving a very aesthetic result.

For the different embodiments of the present invention described above, the first panel 1 and the second panel 2 are preferably panels for a furniture product and may be a part of a frame of a furniture product.

For a furniture product, the set is preferably configured for locking the first panel 1 to the second panel 2 with the first panel surface 16 perpendicular or essentially perpendicular to a second panel surface 28.

An angle $\alpha$ between the junction plane J and the second main plane may be in the range of 15-75°, in the range of 30-60°, and about 45°.

The first edge tongue 23 preferably does not extend through the junction plane J.

The first edge 11 may comprise a third edge tongue 14. The third edge tongue 14 may comprise a first locking surface 15, configured to cooperate with a second locking surface 25 of the second edge tongue 24 for locking in the second direction D2.

The first and/or second panel 1, 2 may have a thickness Y. The thickness Y may be within the range of about 6 mm to about 30 mm preferably about 12 mm to about 24 mm, more preferably about 16 mm to about 19 mm. The first and/or second panel 1, 2 may have the same thickness, or may have different thicknesses.

An outermost end of the second locking surface 25 of the second edge tongue 24 may be positioned at a distance X from a bottom surface 29 of the second edge 21, wherein X is about 0.5-1.5 Y, preferably about 0.75-1.25 Y, more preferably X=Y. An angle $\gamma$ between the second locking surface 25 and the second main plane may be in the range of 15-75°, in the range of 30-60°, and preferably about 45°.

The second edge tongue 24 may have a thickness T.

A ratio between the thickness T and the thickness Y may be within the range of about 0.1 to about 0.5, preferably about 0.2 to about 0.4, more preferably about 0.3.

An outer opening of the edge groove 12 may positioned at a distance Z from the first edge 11, wherein Z is about 0.2-0.8 Y, preferably about 0.35-0.7 Y, more preferably about 0.5-0.6 Y.

The first edge tongue 23 may have a first edge tongue surface 26. An angle $\beta$ between the first edge tongue surface 26 and the second main plane may be in the range of 15-75°, in the range of 30-60°, and preferably about 45°.

The first edge tongue 23 may have a second edge tongue surface 27. The second edge tongue surface 27 may be essentially parallel with a second panel surface 28.

The second edge tongue surface 27 may extend a distance L from the bottom surface 29 of the second edge 21. L may be within the range of about 1 mm to about 3 mm, preferably about 1.5 mm to about 2.5 mm, more preferably about 2 mm.

The first edge tongue surface 26 may extend from the second panel surface 28 of the second panel 2.

The edge groove 12 may have a third locking surface 17. The third locking surface 17 and the second edge tongue surface 27 may be essentially parallel and configured to cooperate for locking in the first direction D1 when the first panel 1 and the second panel 2 are in a locked position. The third locking surface 17 and the second edge tongue surface 27 may preferably be extending essentially in the second direction D2. The third locking surface 17 may extend a distance B into the first panel 1. The distance B may be within the range of about 1.2 mm to about 3.2 mm, preferably about 1.7 mm to about 2.7 mm, more preferably about 2.2 mm.

The second edge tongue 24 may cover the first edge 11 when the first panel 1 and the second panel 2 are in a locked position.

The core of the first panel 1 and/or of the second panel 2 may be a wood-based core, preferably made of MDF, HDF, OSB, WPC, plywood or particleboard. The core may also be a plastic core comprising thermosetting plastic or thermoplastic e.g. vinyl, PVC, PU or PET. The plastic core may comprise fillers.

The first panel 1 and/or the second panel 2 may also be of solid wood.

The first panel 1 and/or the second panel 2 may be provided with a decorative layer, such as a foil or a veneer, on one or more surfaces.

The first panel surface 16 may comprise a decorative layer and the edge groove 12 may extend though the decorative layer.

The edge groove 12, the tongue groove 22 and/or the insertion groove 13 may be formed by mechanical cutting, such as milling or sawing.

The different aspects, embodiments and alternatives described above could be combined with one or more of the other described aspects, embodiments and alternatives.

Further embodiments of the invention are described below:

1. A set of panels comprising a first panel (1) with a first main plane and a second panel (2) with a second main plane, wherein the first panel (1) and the second panel (2) are provided with a mechanical locking device for locking of a first edge (11) of the first panel (1) to a second edge (21) of the second panel (2) at a junction plane (J), wherein the first main plain is essentially perpendicular to the second main plane and the junction plane (J) is extending at an angle to the first main plane and the second main plane between the first main plane and the second main plane, wherein
   the second edge (21) comprises a first edge tongue (23),
   a first panel surface (16) of the first panel (1) comprises an edge groove (12), wherein the first edge tongue (23) is configured to cooperate with the edge groove (12) for locking together the first edge (11) and the second edge (21) in a first direction (D1) which is perpendicular to the second main plane,
   the second edge (21) comprises a second edge tongue (24),
   the second edge tongue (24) comprises a tongue groove (22),
   the first edge (11) comprises a locking element (60), said locking element (60) is configured to cooperate with the tongue groove (22) for locking together the first edge (11) and the second edge (21) in a second direction (D2) which is perpendicular to the first main plane.

2. The set of panels as described in embodiment 1, wherein the locking element (60) comprises a flexible tongue (30) arranged in an insertion groove (13).

3. The set of panels as described in embodiment 2, wherein the junction plane (J) extends through the insertion groove (13).

4. The set of panels as described in embodiment any one of the previous embodiments, wherein the flexible tongue (30) extends through a centre plane (C) of the first panel (1).

5. The set of panels as described in any one of the previous embodiments, wherein an angle (α) between the junction plane (J) and the second main plane is about 45°.

6. The set of panels as described in any one of the previous embodiments, wherein the first edge tongue (23) does not extend through the junction plane (J).

7. The set of panels as described in any one of the previous embodiments, wherein the first edge (11) comprises a third edge tongue (14).

8. The set of panels as described in embodiment 7, wherein a first locking surface (15) of the third edge tongue (14) is configured to cooperate with a second locking surface (25) of the second edge tongue (24) for locking in the second direction (D2).

9. The set of panels as described in any one of the previous embodiments, wherein the first edge tongue (23) has a first edge tongue surface (26), wherein an angle (β) between the first edge tongue surface (26) and the second main plane preferably is about 45°.

10. The set of panels as described in any one of the previous embodiments, wherein the first edge tongue (23) has a second edge tongue surface (27), wherein the second edge tongue surface (27) is essentially parallel with a second panel surface (28).

11. The set of panels as described in embodiment 10, wherein the first edge tongue surface (26) extends from the second panel surface (28) of the second panel (2).

12. The set of panels as described in embodiment 10 or embodiment 11, wherein the edge groove (12) has a third locking surface (17), wherein the third locking surface (17) and the second edge tongue surface (27) are essentially parallel and are configured to cooperate for locking in the first direction (D1) when the first (1) panel and the second (2) panel are in a locked position, and wherein the third locking surface (17) and the second edge tongue surface (27) are preferably extending essentially in the second direction (D2).

13. The set of panels as described in any one of the previous embodiments, wherein the mechanical locking device further comprises at least one rod-shaped element (40) at the second edge (21) and at least one insertion groove (50) at the first panel surface (16), wherein the rod-shaped element (40) is configured to be inserted into the insertion groove (50), the rod-shaped element (40) extends essentially parallel with the second panel surface (28), and the insertion groove (50) extends into the first panel surface (16) at an angle that is essentially perpendicular to the first panel surface (16).

14. The set of panels as described in embodiment 13, wherein the rod-shaped element (40) enters the insertion groove (50) before the second locking surface (25) meets the locking element (60).

15. The set of panels as described in any one of the previous embodiments, wherein a ratio between a thickness T of the second edge tongue (24) and a thickness Y of the first and/or second panel (1, 2) is within the range of about 0.1 to about 0.5, preferably about 0.2 to about 0.4, more preferably about 0.3.

16. The set of panels as described in embodiment 13, wherein the rod-shaped element (40) is positioned partly in the first edge tongue (23) and the insertion groove (50) is positioned partly in the edge groove (12).

17. The set of panels as described in any one of embodiments 13, 14 or 16 wherein the rod-shaped element (40) is arranged in a rod-element groove (41) in the bottom surface (29) of the second edge (21).

18. The set of panels as described in any one of the previous embodiments, wherein a ratio between a thickness T of the second edge tongue (24) and a thickness Y of the first and/or second panel (1, 2) is within the range of about 0.1 to about 0.5, preferably about 0.2 to about 0.4, more preferably about 0.3.

19. The set of panels as described in embodiment 18, wherein an outermost end of the second locking surface (25) of the second edge tongue (24) is positioned at a distance X from a bottom surface (29) of the second edge (21), wherein X is about 0.5-1.5 Y, preferably about 0.75-1.25 Y, more preferably X=Y, and wherein an angle (γ) between the second locking surface (25) and the second main plane preferably is about 45°.

20. The set of panels as described in any one of the previous embodiments, wherein an outer opening of the edge groove (12) is positioned at a distance Z from the first edge (11), wherein Z is about 0.2-0.8 Y, preferably about 0.35-0.7 Y, more preferably about 0.5-0.6 Y.

21. The set of panels as described in any one of the previous embodiments, wherein the second edge tongue surface (27) extends a distance L from the bottom surface (29) of the second edge (21), wherein L is within the range of about 1 mm to about 3 mm, preferably about 1.5 mm to about 2.5 mm, more preferably about 2 mm.

22. The set of panels as described in any one of the previous embodiments, wherein the first edge tongue surface (26) extends from the second panel surface (28) of the second panel (2).

23. The set of panels as described in any one of the previous embodiments, wherein the first and second panel (1, 2) comprise particleboard.

24. The set of panels as described in any one of the previous embodiments, wherein the first and second panel (1, 2) consist essentially of particleboard, possibly comprising a decor coating.

25. The set of panels as described in any one of the previous embodiments, wherein the second edge tongue (24), when the first panel (1) and the second panel (2) are in a locked position, covers the first edge (11).

The invention claimed is:

1. A set of panels comprising a first panel with a first main plane and a second panel with a second main plane, wherein the first panel and the second panel are configured for locking of a first edge of the first panel to a second edge of the second panel at a junction plane, wherein the first main plane is essentially perpendicular to the second main plane and the junction plane is extending at an angle to the first main plane and the second main plane between the first main plane and the second main plane, wherein:
   an entirety of the first edge extends from a first inner-most corner to a first outer-most corner, the first inner-most corner and the first outer-most corner being located on the junction plane when the first and second panels are locked,
   the second edge comprises a first edge tongue,
   a first panel surface of the first panel comprises an edge groove, wherein the first edge tongue is configured to cooperate with the edge groove for locking together the first edge and the second edge in a first direction which is perpendicular to the second main plane,
   the second edge comprises a second edge tongue,
   the second edge tongue comprises a tongue groove, and
   the first edge comprises a locking element, said locking element is configured to cooperate with the tongue groove for locking together the first edge and the second edge in a second direction which is perpendicular to the first main plane.

2. The set of panels as claimed in claim 1, wherein the locking element comprises a flexible tongue arranged in an insertion groove.

3. The set of panels as claimed in claim 2, wherein the flexible tongue extends through a centre plane of the first panel.

4. The set of panels as claimed in claim 1, wherein an angle between the junction plane and the second main plane is about 45°.

5. The set of panels as claimed in claim 1, wherein the first edge tongue does not extend through the junction plane and is entirely on a same side of the junction plane as a majority of the second panel.

6. The set of panels as claimed in claim 1, wherein the first edge comprises a third edge tongue.

7. The set of panels as claimed in claim 6, wherein a first locking surface of the third edge tongue is configured to cooperate with a second locking surface of the second edge tongue for locking in the second direction.

8. The set of panels as claimed in claim 1, further comprising at least one rod-shaped element at the second edge and at least one insertion groove at the first panel surface, wherein the rod-shaped element is configured to be inserted into the insertion groove, the rod-shaped element extends essentially parallel with the second panel surface, and the insertion groove extends into the first panel surface at an angle that is essentially perpendicular to the first panel surface.

9. The set of panels as claimed in claim 8, wherein the rod-shaped element enters the insertion groove before the second locking surface meets the locking element.

10. The set of panels as claimed in claim 1, wherein a ratio between a thickness T of the second edge tongue and a thickness Y of the first and/or second panel is within the range of about 0.1 to about 0.5.

11. The set of panels as claimed in claim 1, wherein an entirety of the second edge extends from a second inner-most corner to a second outer-most corner, the second inner-most corner and the second outer-most corner being located on the junction plane when the first and second panels are locked.

12. A set of panels comprising a first panel with a first main plane and a second panel with a second main plane, wherein the first panel and the second panel are configure for locking of a first edge of the first panel to a second edge of the second panel at a junction plane, wherein the first main plane is essentially perpendicular to the second main plane and the junction plane is extending at an angle to the first main plane and the second main plane between the first main plane and the second main plane, wherein:
   the second edge comprises a first edge tongue,
   a first panel surface of the first panel comprises an edge groove, wherein the first edge tongue is configured to cooperate with the edge groove for locking together the first edge and the second edge in a first direction which is perpendicular to the second main plane,
   the second edge comprises a second edge tongue,
   the second edge tongue comprises a tongue groove,
   the first edge comprises a locking element, said locking element is configured to cooperate with the tongue groove for locking together the first edge and the second edge in a second direction which is perpendicular to the first main plane,
   wherein the locking element comprises a flexible tongue arranged in an insertion groove, and
   wherein the junction plane extends through the insertion groove.

13. A set of panels comprising a first panel with a first main plane and a second panel with a second main plane, wherein the first panel and the second panel are configured for locking of a first edge of the first panel to a second edge of the second panel at a junction plane, wherein the first main plane is essentially perpendicular to the second main plane and the junction plane is extending at an angle to the first main plane and the second main plane between the first main plane and the second main plane, wherein:

the second edge comprises a first edge tongue, a first panel surface of the first panel comprises an edge groove, wherein the first edge tongue is configured to cooperate with the edge groove for locking together the first edge and the second edge in a first direction which is perpendicular to the second main plane, the second edge comprises a second edge tongue, the second edge tongue comprises a tongue groove, the first edge comprises a locking element, said locking element is configured to cooperate with the tongue groove for locking together the first edge and the second edge in a second direction which is perpendicular to the first main plane, wherein the first edge tongue has a first edge tongue surface, wherein an angle between the first edge tongue surface and the second main plane is about 45°.

14. The set of panels as claimed in claim 13, wherein the first edge tongue has a second edge tongue surface, wherein the second edge tongue surface is essentially parallel with a second panel surface of the second panel.

15. The set of panels as claimed in claim 14, wherein the first edge tongue surface extends from the second panel surface of the second panel.

16. The set of panels as claimed in claim 14, wherein the edge groove has a third locking surface, wherein the third locking surface and the second edge tongue surface are essentially parallel and are configured to cooperate for locking in the first direction when the first panel and the second panel are in a locked position, and wherein the third locking surface and the second edge tongue surface are extending essentially in the second direction.

* * * * *